(12) United States Patent
Inomata et al.

(10) Patent No.: US 9,336,683 B2
(45) Date of Patent: May 10, 2016

(54) TRAVEL DISTANCE MEASUREMENT DEVICE

(71) Applicants: Kenji Inomata, Chiyoda-ku (JP); Wataru Tsujita, Chiyoda-ku (JP); Kazuhiro Tahara, Chiyoda-ku (JP); Seiya Nagashima, Chiyoda-ku (JP)

(72) Inventors: Kenji Inomata, Chiyoda-ku (JP); Wataru Tsujita, Chiyoda-ku (JP); Kazuhiro Tahara, Chiyoda-ku (JP); Seiya Nagashima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 99 days.

(21) Appl. No.: 14/342,995

(22) PCT Filed: Nov. 1, 2012

(86) PCT No.: PCT/JP2012/078352
§ 371 (c)(1),
(2) Date: Mar. 5, 2014

(87) PCT Pub. No.: WO2013/105328
PCT Pub. Date: Jul. 18, 2013

(65) Prior Publication Data
US 2014/0218219 A1    Aug. 7, 2014

(30) Foreign Application Priority Data
Jan. 10, 2012 (JP) ................. 2012-002141

(51) Int. Cl.
*G08G 1/123* (2006.01)
*G01S 13/60* (2006.01)
*G01C 22/02* (2006.01)
*G01S 13/86* (2006.01)

(52) U.S. Cl.
CPC ............... *G08G 1/123* (2013.01); *G01C 22/02* (2013.01); *G01S 13/60* (2013.01); *G01S 13/86* (2013.01)

(58) Field of Classification Search
CPC .......... G01S 13/60; G01S 7/352; G01S 7/354; G01S 13/583
See application file for complete search history.

(56) References Cited

U.S. PATENT DOCUMENTS 4,506,353 A * 3/1985 Rott et al. .................. 367/91
5,532,697 A   7/1996 Hidaka et al.
(Continued)

FOREIGN PATENT DOCUMENTS

JP    2-266283    10/1990
JP    8-54461     2/1996
(Continued)

OTHER PUBLICATIONS

U.S. Appl. No. 14/342,981, filed Mar. 5, 2014, Inomata, et al.
(Continued)

*Primary Examiner* — Steven Lim
*Assistant Examiner* — Hongmin Fan
(74) *Attorney, Agent, or Firm* — Oblon, McClelland, Maier & Neustadt, L.L.P.

(57) ABSTRACT

A travel distance measurement device includes a transmitting antenna that is disposed in a vehicle and emits a transmission signal, as a radio wave, toward a ground surface, a receiving antenna that is disposed in the vicinity of the transmitting antenna, and receives a radio wave reflected from the ground surface and acquires a reflection signal, a distance calculator (an IQ demodulator and a phase conversion integrator) that calculates the travel distance of the vehicle on the basis of the acquired reflection signal, a gyro sensor that measures a predetermined parameter regarding curve traveling of the vehicle, and a correcting operation unit that corrects the calculated travel distance on the basis of the measured parameter.

8 Claims, 8 Drawing Sheets

(56) References Cited

U.S. PATENT DOCUMENTS

2005/0195383 A1* 9/2005 Breed et al. .................. 356/4.01
2011/0295549 A1* 12/2011 Takabayashi et al. ........ 702/142

FOREIGN PATENT DOCUMENTS

| | | |
|---|---|---|
| JP | 8-145698 | 6/1996 |
| JP | 11-142509 | 5/1999 |
| JP | 2001-520389 | 10/2001 |
| JP | 2006-513399 | 4/2006 |
| JP | 2009-198362 | 9/2009 |
| WO | WO 99/19745 A1 | 4/1999 |
| WO | WO 03/102625 A1 | 12/2003 |

OTHER PUBLICATIONS

International Search Report issued Jan. 22, 2013, in PCT/JP12/078352 filed Nov. 1, 2012.

* cited by examiner

TRAVEL DISTANCE MEASUREMENT DEVICE

FIELD OF THE INVENTION

The present invention relates to a travel distance measurement device that measures the travel distance of a vehicle.

BACKGROUND OF THE INVENTION

As a travel distance measurement device that is mounted to a vehicle (railroad train) and measures the travel distance of the vehicle by using a radio wave, there is provided, for example, a device that uses a Doppler frequency, as shown in patent reference 1. The device shown in this patent reference 1 emits a radio wave as a transmission signal toward a ground surface (rail track surface) first, and acquires a Doppler signal component by mixing a reflection signal which is a reflected wave reflected from the ground surface with the transmission signal. The device then analyzes the Doppler frequency of the signal and calculates and integrates the traveling speed of the vehicle, thereby acquiring the travel distance of the vehicle.

RELATED ART DOCUMENT

Patent Reference

Patent reference 1: Japanese Unexamined Patent Application Publication No. Hei 11-142509

SUMMARY OF THE INVENTION

Problems to be Solved by the Invention

On the other hand, when the vehicle to which the travel distance measurement device is mounted is traveling around a curve, the travel distance measured by the travel distance measurement device becomes shorter than the travel distance actually traveled by the vehicle, and an error occurs in the measured travel distance. A problem with the conventional travel distance measurement device shown in the patent reference 1 is, however, that a measuring error occurring when the vehicle is traveling around a curve is not taken into consideration, and hence the travel distance cannot be measured correctly.

The present invention is made in order to solve the above-mentioned problem, and it is therefore an object of the present invention to provide a travel distance measurement device that can measure the travel distance of a vehicle correctly even when the vehicle is traveling around a curve.

Means for Solving the Problem

In accordance with the present invention, there is provided a travel distance measurement device including: a transmitter that is disposed in a vehicle and emits a transmission signal, as a radio wave, toward a ground surface; a receiver that is disposed in the vicinity of the transmitter, and receives a radio wave emitted from the transmitter and reflected from the ground surface and acquires a reflection signal; a distance calculator that calculates the travel distance of the vehicle on the basis of the reflection signal acquired by the receiver; a curve parameter measuring unit that measures a predetermined parameter regarding curve traveling of the vehicle; and a correcting operator that corrects the travel distance calculated by the distance calculator on the basis of the parameter measured by the curve parameter measuring unit.

Advantages of the Invention

Because the travel distance measurement device in accordance with the present invention is constructed as above, the travel distance measurement device can measure the travel distance of the vehicle correctly even when the vehicle is traveling around a curve.

EMBODIMENTS OF THE INVENTION

Hereafter, the preferred embodiments of the present invention will be explained in detail with reference to the drawings. Although a case in which a travel distance measurement device in accordance with the present invention is mounted to a railroad train is shown hereafter, the travel distance measurement device can be similarly applied to other vehicles (e.g., cars).

Embodiment 1

Figure 1:
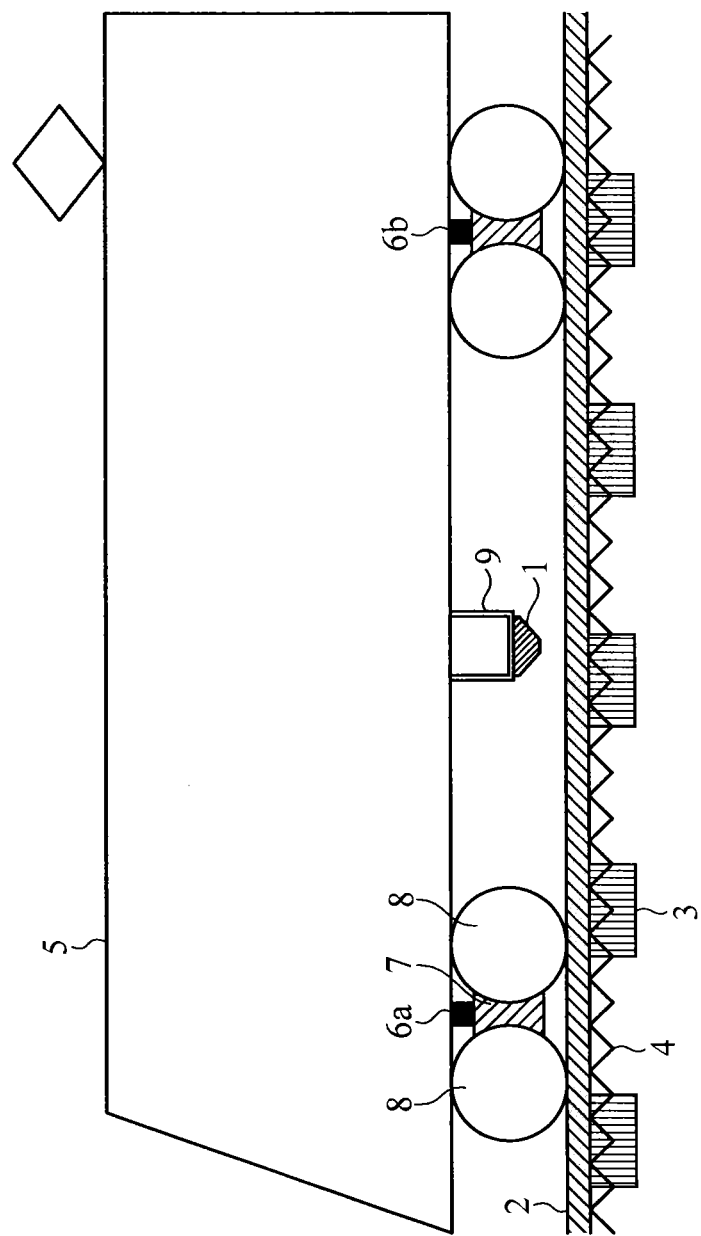
FIG. 1 is a diagram showing a vehicle to which a travel distance measurement device in accordance with Embodiment 1 of the present invention is mounted.

FIG. 1 is a diagram showing a railroad train to which the travel distance measurement device 1 in accordance with Embodiment 1 is mounted. As shown in FIG. 1, rails 2 are laid along a track along which a vehicle travels and sleepers 3 for supporting the rails 2 are laid under the rails at predetermined intervals. Further, gravels (ballast) 4 are packed between the sleepers 3. On the other hand, a railway bogie 7 is connected, via a connection shaft 6 (6a or 6b), to each of front and rear portions of the base of each vehicle body 5 of the railroad train, and wheels 8 are mounted to this railway bogie 7. Further, the travel distance measurement device 1 is mounted, via an outfitting member 9, to an approximately central portion of the base of the vehicle body 5 (midpoint between the connection shaft 6a and the connection shaft 6b). The gap between the base of the travel distance measurement device 1 and the upper surface of each of the rails 2 is set to be about 20 to 60 cm.

Figure 2:
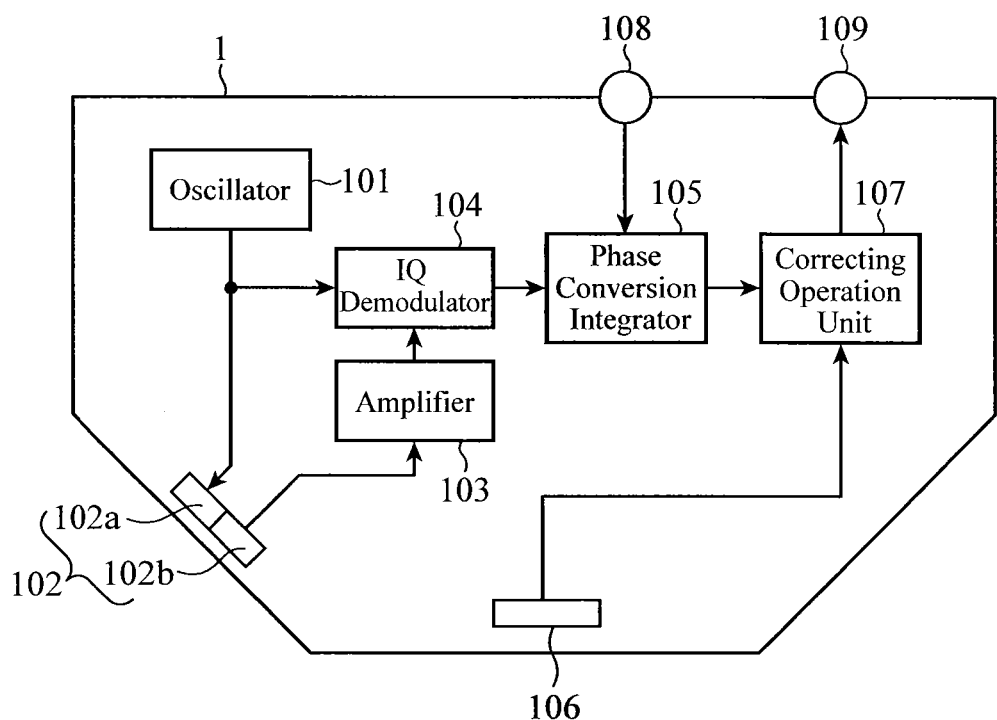
FIG. 2 is a diagram showing the internal structure of the travel distance measurement device in accordance with Embodiment 1 of the present invention.

Next, the internal structure of the travel distance measurement device 1 will be explained with reference to FIG. 2. The travel distance measurement device 1 measures the travel distance of the vehicle. This travel distance measurement device 1 is comprised of an oscillator 101, a transmitting antenna (transmitter) 102a, a receiving antenna (receiver) 102b, an amplifier 103, an IQ demodulator 104, a phase conversion integrator 105, a gyro sensor (curve parameter measuring unit) 106, a correcting operation unit (correcting operator) 107, an input terminal 108, and an output terminal 109, as shown in FIG. 2.

The oscillator 101 generates a high frequency signal. In this embodiment, the oscillator 101 outputs a stable high frequency signal by synchronizing a PLL (phase lock loop) with a reference signal source having an excellent temperature characteristic, such as a crystal oscillator. The high frequency signal generated by this oscillator 101 is outputted as a transmission signal to the transmitting antenna 102a and the IQ demodulator 104.

The transmitting antenna 102a emits the transmission signal from the oscillator 101, as a radio wave, toward a ground surface (in a direction which is oriented diagonally downward with respect to the traveling direction of the vehicle). The receiving antenna 102b is disposed in the vicinity of the transmitting antenna 102a, and receives a radio wave emitted from the transmitting antenna 102a and reflected from the ground surface and acquires a reflection signal. The reflection signal acquired by this receiving antenna 102b is outputted to the amplifier 103.

The transmitting antenna 102a and the receiving antenna 102b can be formed on an identical board in a case in which each of them is constructed of a patch antenna. In this case, they can be handled as one antenna 102 in view of components, and can be formed to include the transmitting antenna 102a and the receiving antenna 102b as its functions. It is further assumed that the polarization directions of the transmitting antenna 102a and the receiving antenna 102b are horizontal ones. More specifically, the polarization directions of the transmitting antenna and the receiving antenna are parallel to the longitudinal direction of the sleepers 3, while the polarization directions are perpendicular to the longitudinal direction of the rails 2.

The amplifier 103 amplifies the reflection signal from the receiving antenna 102b to a predetermined amplitude level. The reflection signal amplified by this amplifier 103 is outputted to the IQ demodulator 104.

The IQ demodulator 104 carries out orthogonal detection on the reflection signal from the amplifier 103 by using the transmission signal from the oscillator 101 as a reference signal. The signal on which the orthogonal detection is carried out by this IQ demodulator 104 is outputted to the phase conversion integrator 105.

The phase conversion integrator 105 calculates the travel distance of the vehicle by calculating and integrating the phase on the basis of the signal from the IQ demodulator 104. The phase conversion integrator 105 returns the travel distance to zero when a reset signal is inputted thereto from outside the travel distance measurement device via the input terminal 108. A signal showing the travel distance calculated by this phase conversion integrator 105 is outputted to the correcting operation unit 107. The IQ demodulator 104 and the phase conversion integrator 105 construct a distance calculator.

The gyro sensor 106 measures the rotation angular speed of the vehicle. A signal showing the rotation angular speed measured by this gyro sensor 106 is outputted to the correcting operation unit 107. The correcting operation unit 107 corrects the travel distance calculated by the phase conversion integrator 105 on the basis of the rotation angular speed measured by the gyro sensor 106. A signal showing the travel distance corrected by this correcting operation unit 107 is outputted to outside the travel distance measurement device via the output terminal 109.

Figure 3:
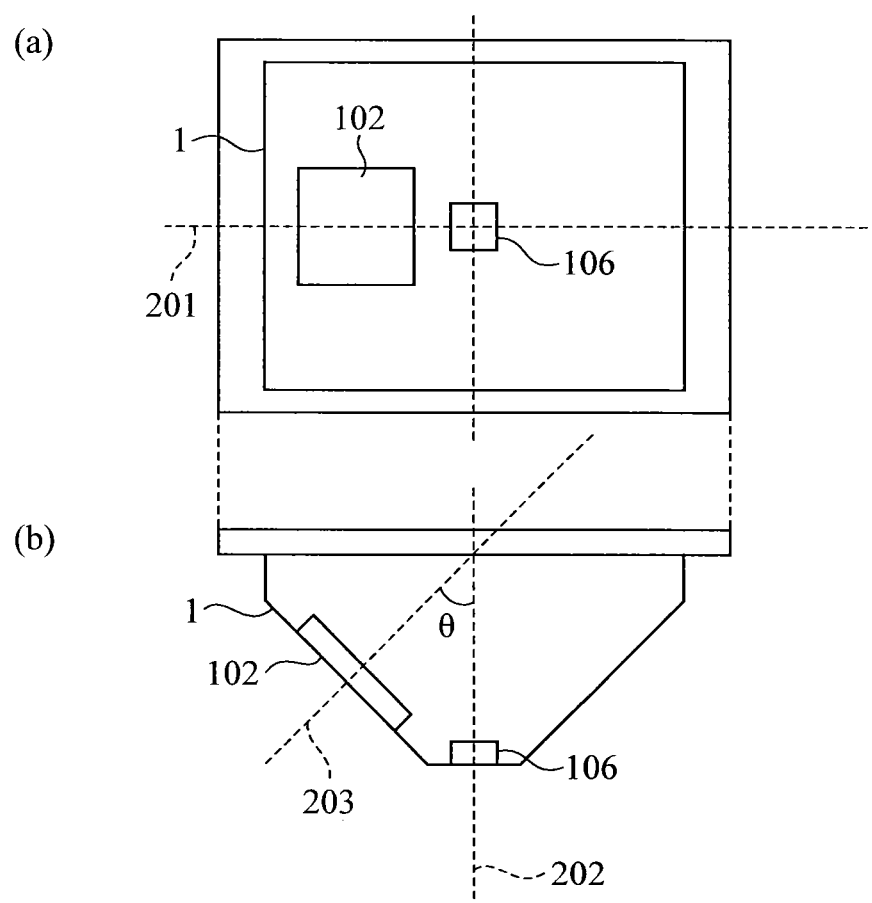
FIG. 3 is a diagram showing an example of the arrangement of antennas and a gyro sensor of the travel distance measurement device in accordance with Embodiment 1 of the present invention.

Next, an example of the arrangement of the antenna 102 and the gyro sensor 106 of the travel distance measurement device 1 will be explained with reference to FIG. 3. FIG. 3(a) is a schematic diagram showing the travel distance measurement device 1 which is viewed from the base thereof, and FIG. 3(b) is a schematic diagram of the travel distance measurement device 1 which is viewed from one side thereof. In FIG. 3(a), a dashed line 201 is a bisector dividing the travel distance measurement device 1 equally and symmetrically into two right and left portions, and matches the traveling direction of the vehicle. Further, in FIG. 3(b), a dashed line 202 is a perpendicular bisector dividing the travel distance measurement device 1 equally and symmetrically into front and rear portions. Further, a dashed line 203 is inclined an angle θ with respect to the perpendicular line 202 toward the direction which is oriented diagonally downward with respect to the traveling direction of the vehicle. The angle θ is 45 degrees. As shown in this FIG. 3, the antenna 102 is placed in such a way that its center is located on the dashed line 201, and the direction of emitting the radio wave matches the dashed line 203. Further, the gyro sensor 106 is placed in such a way as to be located on the perpendicular line 202 (the center of the travel distance measurement device 1).

Figure 4:
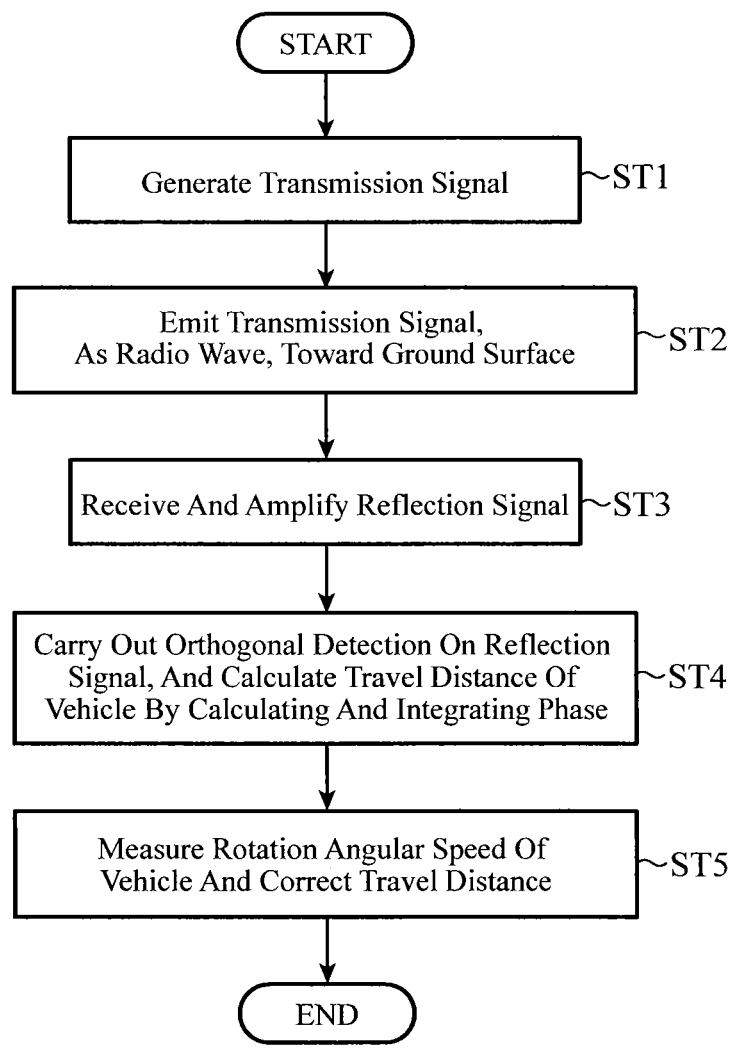
FIG. 4 is a flow chart showing the operation of the travel distance measurement device in accordance with Embodiment 1 of the present invention.

Next, the operation of the travel distance measurement device 1 constructed as above will be explained with reference to FIG. 4. In the operation of the travel distance measurement device 1, the oscillator 101 generates a high frequency signal (transmission signal) first, as shown in FIG. 4 (step ST1). In this embodiment, in order to make the phase of the reflected wave vary as the vehicle body 5 travels, it is necessary to choose a frequency which makes it possible to assume that the rail track surface is not smooth, but rough with respect to the transmission wave. A Rayleigh reference is known as a reference for this frequency, the rail track surface can be handled as a rough surface as long as the transmission wave has a wavelength shorter than one eighth of the gap between irregularities on an object. The gap between irregularities on a ground shape including sleepers 3 and gravels 4 is about 10 cm. In this case, by using a radio wave having a wavelength equal to or shorter than 10 cm÷8=1.25 cm, i.e., a radio wave having a frequency equal to or higher than 3×10^8÷0.0125 m=24 GHz, the rail track surface is assumed to be a rough surface with respect to the radio wave. The rail track surface is a horizontal plane including sleepers 3 and gravels 4. Needless to say, the rail track surface has an inclined portion which is called cant at its curved portion. A surface parallel to the upper surfaces of sleepers 3 is called a rail track surface.

Figure 5:
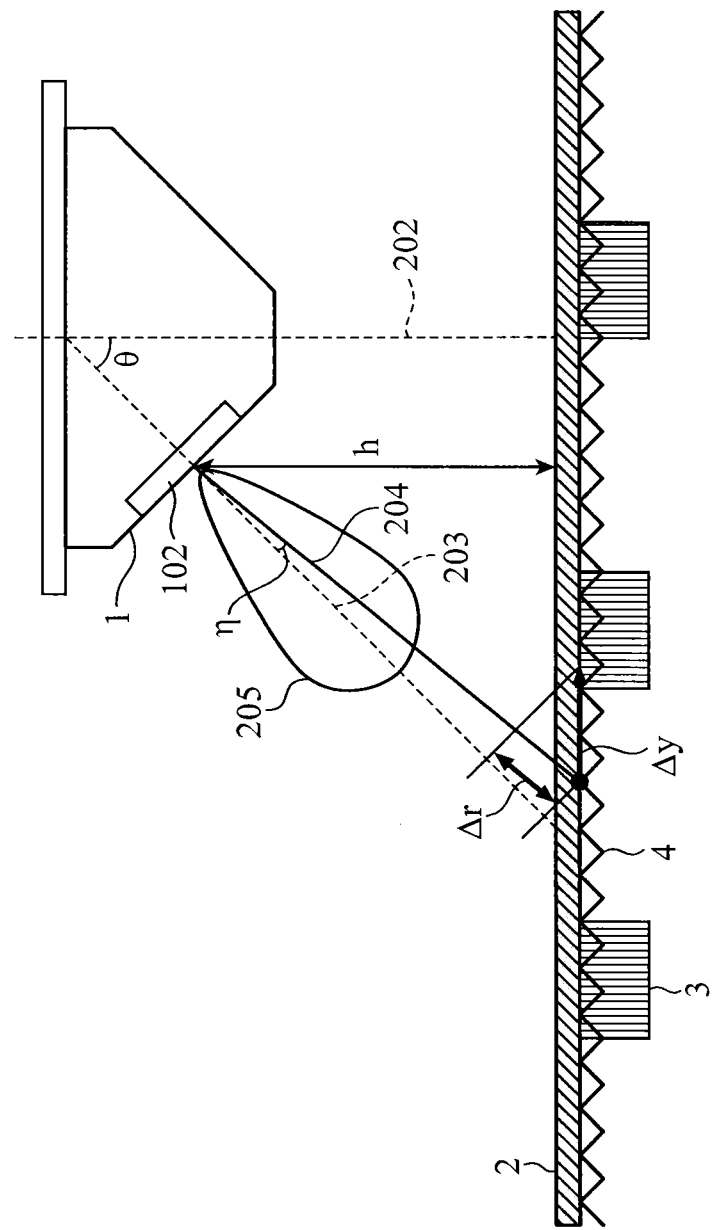
FIG. 5 is a diagram explaining transmission and reception of a radio wave which are carried out by the travel distance measurement device in accordance with Embodiment 1 of the present invention.

The transmitting antenna 102a then emits the transmission signal from the oscillator 101, as a radio wave, toward the ground surface (in a direction which is oriented diagonally downward with respect to the traveling direction of the vehicle) (step ST2). The transmission wave emitted from this transmitting antenna 102a is applied to a region centered at a point where the dashed line 203 intersects the rail track surface, as shown in FIG. 5, and is reflected by the sleepers 3 and the gravels 4 in the region to which the transmission wave is applied. Because the transmission wave is applied toward the diagonal direction, the reflection from a point slightly closer to the transmitting antenna than the point where the dashed line 203 intersects the rail track surface (point where a solid line 204 intersects the rail track surface) is the strongest. This is because the point closer to the transmitting antenna has a shorter distance between the antenna 102 and the rail track surface than the point where the dashed line intersects the rail track surface, and this variation depends upon the sharpness of the directivity of the transmitting antenna 102a. More specifically, the direction in which the reflection intensity is the strongest moves closer to the dashed line 203 (the variation decreases) as the directivity becomes sharper, while the direction in which the reflection intensity is the strongest moves further from the dashed line 203 (the variation increases) as the directivity becomes wider. For example, in a case in which the transmitting antenna 102a and the receiving antenna 102b are arranged close to each other (at a distance of about 10 cm or shorter from each other), the direction in which the transmitting antenna has a maximum directional gain is the same as that in which the receiving antenna has a maximum directional gain, the transmitting antenna and the receiving antenna are an antenna having 6×6 patches whose angle θ is 45 degrees, the reflection in a direction of 42 degrees is the strongest.

Then, the receiving antenna 102b receives a radio wave emitted from the transmitting antenna 102a and reflected by a ground surface and acquires a reflection signal, and the amplifier 103 amplifies this reflection signal to a predetermined amplitude level (step ST3).

Then, the IQ demodulator 104 carries out orthogonal detection on the reflection signal from the amplifier 103 by using the transmission signal from the oscillator 101 as the reference signal, and the phase conversion integrator 105 calculates the phase from the result of this orthogonal detection and integrates the phase to calculate the travel distance of the vehicle (step ST4). Hereafter, a change in the output of the phase conversion integrator 105 which is caused by the travel of the vehicle will be explained by using FIG. 5.

First, a method of determining the direction of the solid line 204 shown in FIG. 5 will be explained. In the example shown in FIG. 5, it is assumed that the transmitting antenna 102a has the same directivity pattern 205 as the receiving antenna 102b. Further, a function showing the directivity pattern 205 is expressed by F(η). η is the angle which the solid line has with respect to the dashed line 203. If the ground reflectivity and the absolute gain of the antenna 102 can be neglected, the intensity H(θ) of the reflected wave is expressed by the following equation (1).

$$H(\eta) = \left(\frac{F(\eta)}{4\pi}\left(\frac{\cos(\theta-\eta)}{h}\right)^2\right)^2 \tag{1}$$

where h is the height from the rail track surface to the midpoint between the transmitting antenna 102a and the receiving antenna 102b. When the angle η maximizing this H(η) is determined, the direction of the angle is defined as the direction of the solid line 204. The directivity patterns 205 of the transmitting antenna 102a and the receiving antenna 102b are measured in advance. Using this equation (1), the direction of the solid line 204 (angle η) can be determined from the directivity pattern 205 (F(η)) of the antenna 102, the height h of the antenna 102, and the mounting angle θ of the antenna 102. After that, the travel distance of the vehicle is calculated by using the reflected wave propagating from the direction of this solid line 204.

In the example shown in FIG. 5, gravels 4 (or sleepers 3 or the like) exist at the point where the solid line 204 and the rail track surface intersect each other, and a vector Δy shows the direction in which these gravels 4 apparently travel per micro unit time and the distance which the gravels apparently travel per micro unit time. Needless to say, although the gravels 4 do not travel actually while the vehicle (travel distance measurement device 1) travels actually, a travel will be considered hereafter with reference to the travel distance measurement device 1. Further, each micro unit time is a time interval during which the distance traveled by the vehicle traveling at its maximum speed is a value (1/10 or less) sufficiently smaller than the wavelength of the transmission wave.

An amount of change Δr of the distance which the gravels 4 travel with respect to the antenna 102 is expressed by the following equation (2).

$$\Delta r = \Delta y \times \sin(\theta - \eta) \tag{2}$$

Further, when the wavelength of the transmission wave is expressed by λ, the phase θ of the reflected wave changes per micro unit time by a value given by the following equation (3).

$$\Delta\theta = 2(2\pi/\lambda) \times \Delta r \tag{3}$$

This change of the phase Δθ appears as a change of the output of the IQ demodulator 104. At this time, the IQ demodulator 104 outputs an IQ signal having two components which are an I component and a Q component by carrying out orthogonal detection on the reflection signal and the transmission signal. The phase conversion integrator 105 then acquires the phase from atan (Q/I). atan is an arc tangent. Because the difference phase between the phase and that acquired before one micro unit time is Δθ, the travel distance Δy per micro unit time can be calculated. Therefore, by integrating this difference phase Δθ, the distance which the vehicle has traveled during the integral time can be determined.

In the above explanation, the case in which the phase is determined from the output of the IQ demodulator 104, the difference phase is determined from this phase, and the travel distance is calculated by further integrating the difference phase is shown. However, the plurality of above-mentioned processes are unnecessary in actuality, and the travel distance of the vehicle can be calculated directly from the output of the IQ demodulator 104. This calculation will be explained with reference to FIG. 6.

Figure 6:
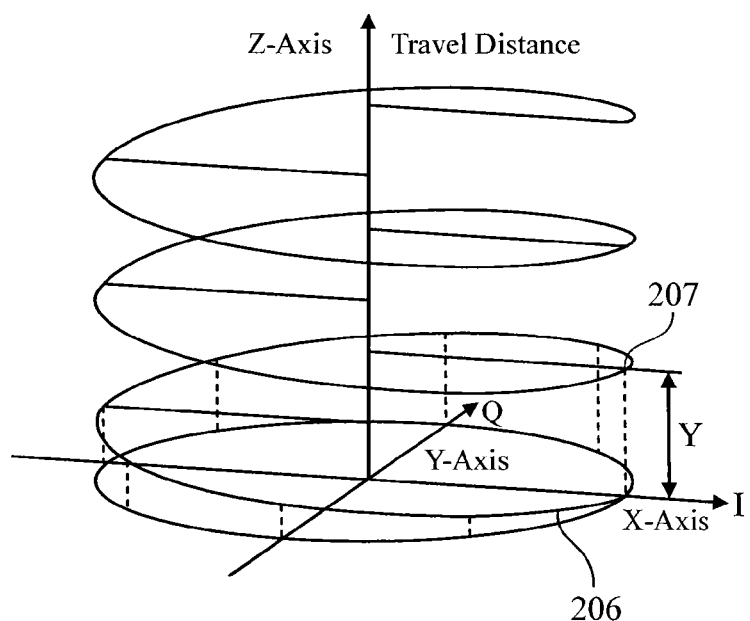
FIG. 6 is a diagram explaining the calculation of a travel distance which is carried out by a phase conversion integrator in accordance with Embodiment 1 of the present invention.

FIG. 6 is a diagram showing a relationship between the I component (X-axis) and the Q component (Y-axis) of the output of the IQ demodulator 104, and the travel distance (Z-axis) of the vehicle. Reference numeral 206 in this diagram denotes a spiral showing the phase rotating on an X-Y plane in such a way that the phase extends along a Z-axis. The phase rotates clockwise, and the clockwise rotation of the phase is defined as a positive rotation. When the integrated phase is determined from the output of the IQ demodulator 104, this integrated phase is defined as one point on the spiral 206. When the integrated phase is expressed by ψ, the travel distance Y is expressed by the following equation (4).

$$Y = \psi/(\sin(\theta-\eta) \times 4\pi/\lambda) \tag{4}$$

In FIG. 6, a point 207 on the spiral 206 is the one where the phase changes from 2π to 0. In this case, the phase is calculated by assuming that the phase rotates along the spiral 206, and, during the next rotation, does not return from 2π to 0, but rotates from 2π to 4π. Integrating the phase in such a way as to make these discontinuities of the phase continuous is known as phase unwrapping, and the method is used in this embodiment. More specifically, the phase is integrated over an interval of $2\pi$ or more, and the travel distance is determined from the integrated phase. The processing speed is important in order for this phase unwrapping to function well. More specifically, even when the vehicle is traveling at its maximum speed, the processing speed is determined in such a way that a number of sample points adequate for the phase to rotate one round are acquired. Therefore, it is necessary to carry out the processing at time intervals having a length equal to or smaller than one micro unit time explained previously.

As mentioned above, the phase conversion integrator 105 can calculate the travel distance directly from the output of the IQ demodulator 104 by integrating the phase over an interval of $2\pi$ or more to determine the integrated phase. The travel distance measurement device 1 in accordance with the present invention does not use amplitude information when calculating the travel distance of the vehicle. This amplitude information is very unstable, and the amplitude changes greatly because the conditions of reflection of the radio wave from the rail track vary due to rain, snowfall, etc. Further, the amplitude changes in spike shape when the vehicle travels above a metallic object, such as an iron bridge or point. The frequency component of this waveform having a spike shape has a very wide band, and a problem with a conventional method of calculating the travel distance of the vehicle by analyzing the Doppler frequency is that the Doppler spectrum changes greatly as a whole and the Doppler frequency cannot be acquired correctly. In contrast with this, because the travel distance measurement device 1 in accordance with the present invention can calculate the travel distance of the vehicle without using the amplitude information, the travel distance can be calculated correctly even when the conditions of reflection of the radio wave from the rail track vary. The phase conversion integrator 105 returns the travel distance to zero when the reset signal is inputted thereto from outside the travel distance measurement device via the input terminal 108.

Returning to the explanation of the operation of the travel distance measurement device 1 shown in FIG. 4, the gyro sensor 106 measures the rotation angular speed of the vehicle, and the correcting operation unit 107 corrects the travel distance calculated by the phase conversion integrator 105 on the basis of this rotation angular speed (step ST5). Hereafter, an error occurring in the output of the phase conversion integrator 105 when the vehicle is traveling around a curve and the correcting method using the gyro sensor 106 and the correcting operation unit 107 will be explained with reference to FIG. 7.

Figure 7:
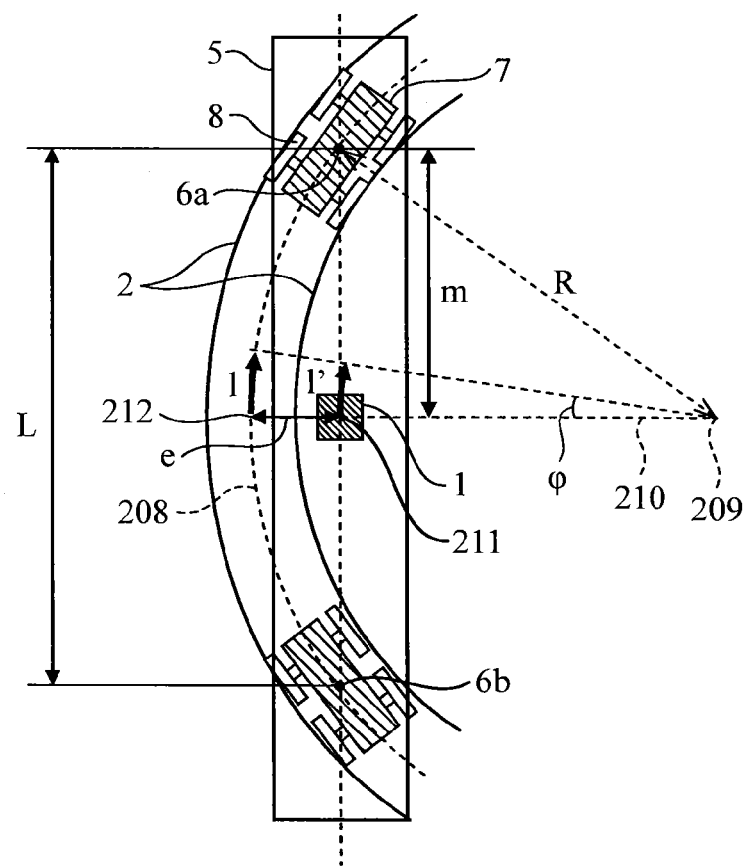
FIG. 7 is a diagram explaining an error occurring in the output of the phase conversion integrator in accordance with Embodiment 1 of the present invention when the vehicle is traveling around a curve.

In FIG. 7, a dashed line 208 shows the center of the rails 2, a central point 209 shows the center of the radius of the curve around which the vehicle is traveling, a line segment 210 is the one passing through the central point 209 and the center of the travel distance measurement device 1, a point of intersection 211 is the one (the center of the travel distance measurement device 1) where the dashed line 210 intersects the normal extending from the connection shaft 6a to the dashed line 210, and a point of intersection 212 is the one where the dashed line 208 intersects the dashed line 210.

When the distance (curve radius) from the central point 209 to the connection shaft 6a is expressed by R, the distance from the travel distance measurement device 1 (point of intersection 211) to the connection shaft 6a is expressed by m, and the distance between the connection shaft 6a and the connection shaft 6b is expressed by L, the distance e between the point of intersection 211 and the point of intersection 212 is expressed by the following equation (5).

$$e = R - \sqrt{R^2 - Lm + m^2} \quad (5)$$

This distance e is the value by which the travel distance measurement device 1 is located inwardly from the dashed line 208 which is the center of the rails because of the curve traveling of the vehicle, and increases with decrease in the curve radius R. More specifically, the shorter the curve radius R, the more inside path in the curve the travel distance measurement device 1 passes through. Although this fact causes a serious problem on a device of noncontact type that observes a ground surface and measures a speed and a travel distance, such as the travel distance measurement device 1, the fact has not come to be seen as a problem until now.

Further, when the rotation angle of the vehicle traveling during a micro unit time is expressed by $\phi$, the amount of travel l of the vehicle traveling during the micro unit time is expressed by the following equation (6).

$$l = R\phi \quad (6)$$

On the other hand, the amount of travel l' of the travel distance measurement device 1 traveling during the micro unit time is expressed by the following equation (7).

$$l' = (R-e)\phi \quad (7)$$

The difference $\Delta l$ between the amount of travel l and the amount of travel l' is then given by the following equation (8).

$$\Delta l = l - l' = e\phi \quad (8)$$

Therefore, a rate of reduction k is expressed by the following equation (9).

$$k = \frac{\Delta l}{l} = \frac{e}{R} \quad (9)$$

More specifically, the travel distance of the vehicle measured by the device of noncontact type that observes a ground surface and measures a speed and a travel distance (travel distance measurement device 1) becomes shorter than the travel distance actually traveled by the vehicle every time when the vehicle travels around a curve even though the curve is a right one or a left one, and the speed is observed to be less than the actual speed by the rate of reduction k. For example, in a case in which the curve radius R is 160 m, the distance L between the connection shafts 6a and 6b is 14.176 m, and the device of noncontact type that observes a ground surface and measures a JO speed and a travel distance is placed at the midpoint between the connection shaft 6a and the connection shaft 6b, the rate of reduction k is about 0.1%.

Errors shown above are integrated cumulatively unless the vehicle is traveling along a perfect straight line. Therefore, when applied to a railroad having a long travel distance, errors may have a value which cannot be neglected. As a result, when automatic train control or the like is carried out, for example, there is a case in which a railroad train cannot stop at a target station precisely, cannot stop just before the platform door fence, or transmits erroneous position information to the next railroad train.

In order to solve this problem, in accordance with Embodiment 1, the gyro sensor 106 that measures the rotation angular speed of the vehicle independently is used. The gyro sensor 106 measures the yaw rotation angle per unit time of the vehicle body 5 with respect to the traveling direction of the vehicle body. The yaw angle per micro unit time matches the rotation angle φ.

The following equation (10) can be acquired by combining the equations (5) to (7).

$$l = \phi \sqrt{Lm - m^2 + \left(\frac{l'}{\phi}\right)^2} \qquad (10)$$

This equation (1) shows that the travel distance l of the vehicle can be calculated from the distance l' measured by the travel distance measurement device 1, the rotation angle φ per micro unit time measured by the gyro sensor 106, the distance m from the travel distance measurement device 1 (point of intersection 211) to the connection shaft 6a, and the distance L between the connection shafts 6a and 6b.

As a concrete operation of the correcting operation unit 107, the correcting operation unit stores the travel distance which the vehicle has traveled before a micro unit time elapses, and calculates the difference l' between the travel distance stored therein and the current travel distance Y which is the output of the phase conversion integrator 105. The correcting operation unit then calculates the distance l which the vehicle has traveled from this difference l' by using the equation (10). After that, the correcting operation unit calculates and integrates the error amount (l–l') when the vehicle is traveling around a curve. The correcting operation unit then outputs, as a final travel distance, a value which the correcting operation unit acquires by adding the amount G of integrated errors to the travel distance Y.

As mentioned above, because the travel distance measurement device in accordance with this Embodiment 1 is constructed in such a way as to, when the vehicle is traveling around a curve, measure the rotation angular speed of the vehicle by using the gyro sensor 106 and correct the measurement result in order to prevent the measurement result from becoming shorter than the actual travel distance due to an error occurring because the travel distance measurement device 1 moves along an inside path in the curve, the travel distance measurement device can measure the travel distance correctly when the vehicle is traveling around a curve. Further, because the travel distance measurement device is constructed in such a way as to measure the travel distance of the vehicle from the phase of a reflected wave without using amplitude information, the travel distance measurement device can measure the travel distance of the vehicle correctly even in a state in which the conditions of reflection of the radio wave from the rail track vary, such as when a metallic object exists in front of the travel distance measurement device. In addition, because the travel distance measurement device is constructed in such a way as to use a reflected wave from a direction in which the reflection intensity is maximized, the measurement accuracy can be improved.

Embodiment 2

Figure 8:
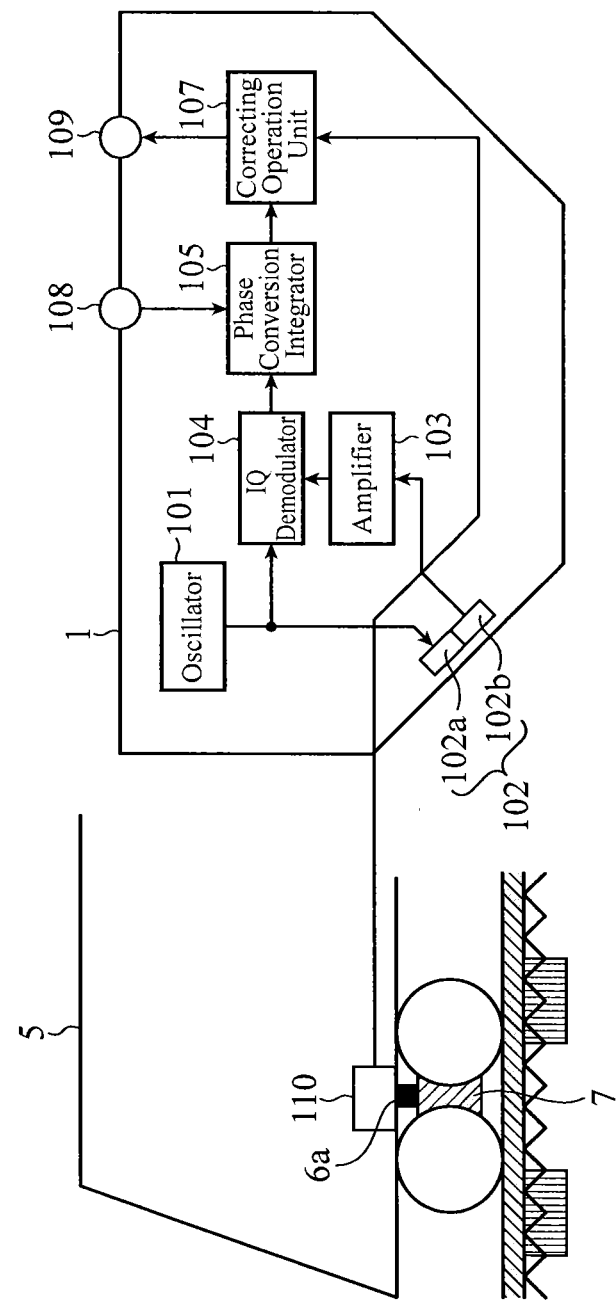
FIG. 8 is a diagram showing the internal functions of a travel distance measurement device in accordance with Embodiment 2 of the present invention.

In Embodiment 1, the case in which the gyro sensor 106 that measures the rotation angular speed of the vehicle is used as the curve parameter measuring unit that measures the predetermined parameter about the curve traveling of the vehicle is shown. In contrast with this, a case in which an angle measuring device 110 that measures an angle of a vehicle with respect to a ground surface (rail track surface) is used is shown in Embodiment 2. FIG. 8 is a diagram showing a vehicle to which a travel distance measurement device 1 in accordance with Embodiment 2 of the present invention is mounted. In the travel distance measurement device 1 in accordance with Embodiment 2 shown in FIG. 8, the gyro sensor 106 of the travel distance measurement device 1 in accordance with Embodiment 1 shown in FIG. 1 is replaced by the angle measuring device (curve parameter measuring unit) 110. The other structural components are the same as those in accordance with Embodiment 1 and are designated by the same reference numerals, and therefore the explanation of the structural components will be omitted hereafter.

The angle measuring device 110 is mounted to a connection shaft 6 of the vehicle, and measures the angle of the vehicle with respect to the ground surface by measuring an angle of a railway bogie 7 with respect to a vehicle body 5. As this angle metering device 110, for example, an encoder or the like can be applied. A signal showing the angle measured by this angle metering device 110 is outputted to a correcting operation unit 107. The correcting operation unit 107 corrects a travel distance calculated by a phase conversion integrator 105 on the basis of the angle measured by the angle measuring device 110 instead of the rotation angular speed measured by the gyro sensor 106.

The angle of the railway bogie 7 with respect to the vehicle matches the angle which the line segment 210 shown in FIG. 7 forms with the line segment R. When the angle of the railway bogie 7 with respect to the vehicle is expressed by a relationship shown by the following equation (11) is established. Substituting this equation (11) into the equation (6) and then arranging this equation using the equations (5) and (7), the following equation (12) is acquired.

More specifically, as a concrete operation of the correcting operation unit 107, the correcting operation unit stores the travel distance which the vehicle has traveled before a micro unit time elapses, and calculates the difference l' between the travel distance stored therein and the current travel distance Y which is the output of the phase conversion integrator 105. The correcting operation unit then calculates the distance l which the vehicle has traveled from this difference l' by using the angle measured by the angle measuring device 110. After that, the correcting operation unit calculates and integrates the error amount (l–l') when the vehicle is traveling around a curve. The correcting operation unit then outputs, as a final travel distance, a value which the correcting operation unit acquires by adding the amount G of integrated errors to the travel distance Y.

As mentioned above, the travel distance measurement device in accordance with this Embodiment 2 is constructed in such a way as to measure the angle of the vehicle with respect to a ground surface, and correct a measuring error occurring in the travel distance at a time when the vehicle is traveling around a curve. Even in this case, the same advantages as those provided by Embodiment 1 can be provided. Further, in order to measure a small curve in a case of using the gyro sensor 106, a sensor having high sensitivity is required. However, in a case in which an encoder is used, what is necessary is just to be able to measure the angle of the railway bogie 7 with respect to the vehicle, and the measurement can be carried out at a low cost with a high degree of accuracy.

Embodiment 3

Figure 9:
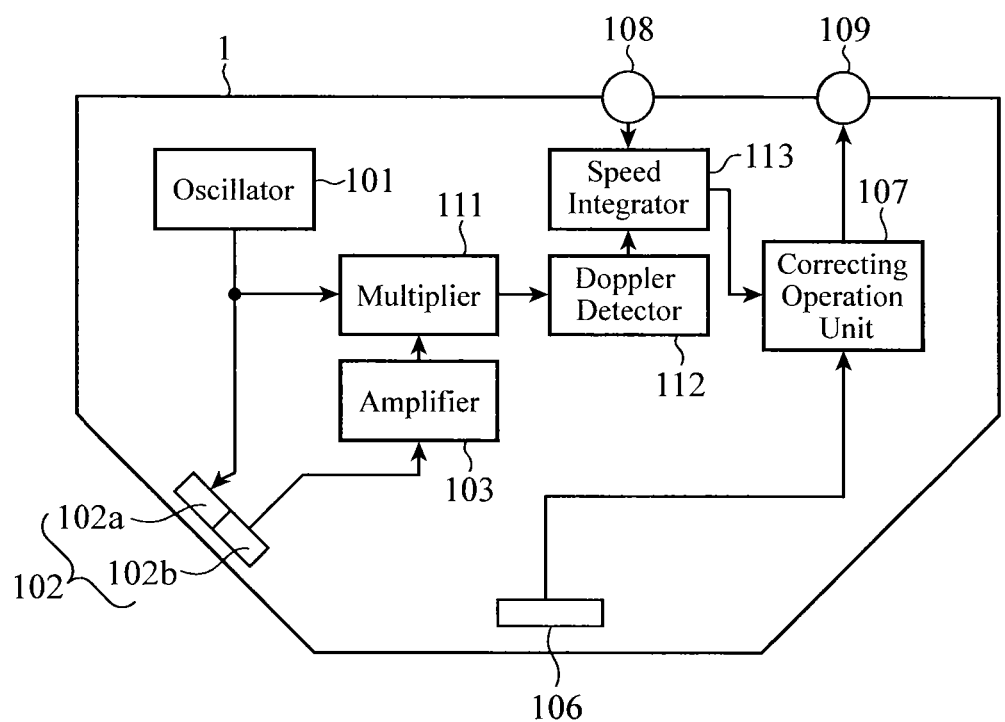
FIG. 9 is a diagram showing the internal functions of a travel distance measurement device in accordance with Embodiment 3 of the present invention.

In Embodiments 1 and 2, the case in where the distance calculator calculates the travel distance of the vehicle by using the phase is shown. In contrast with this, a case in which a distance calculator calculates the travel distance of a vehicle by using a Doppler frequency will be shown in Embodiment 3. FIG. 9 is a diagram explaining the internal functions of a travel distance measurement device 1 in accordance with Embodiment 3. In the travel distance measurement device 1 in accordance with Embodiment 3 shown in FIG. 9, the IQ demodulator 104 and the phase conversion integrator 105 of the travel distance measurement device 1 in accordance with Embodiment 1 which are shown in FIG. 2 are replaced by a multiplier 111, a Doppler detector 112, and a speed integrator 113. The other structural components are the same as those in accordance with Embodiment 1 and are designated by the same reference numerals, and therefore the explanation of the structural components will be omitted hereafter.

The multiplier 111 multiplies a reflection signal from an amplifier 103 by a high frequency signal, as a reference signal, from an oscillator 101. The signal which is multiplied by the high frequency signal by this multiplier 111 is outputted to the Doppler detector 112.

The Doppler detector 112 detects a Doppler signal on the basis of the signal from the multiplier 111. The Doppler signal detected by this Doppler detector 112 is outputted to the speed integrator 113.

The speed integrator 113 calculates the travel distance of the vehicle on the basis of the Doppler signal from the Doppler detector 112. When a reset signal is inputted from outside the travel distance measurement device via an input terminal 108, the speed integrator 113 returns the travel distance to zero. A signal showing the travel distance calculated by this speed integrator 113 is outputted to a correcting operation unit 107. The multiplier 111, the Doppler detector 112, and the speed integrator 113 construct the distance calculator.

The correcting operation unit 107 also corrects the travel distance calculated by the speed integrator 113 on the basis of the rotation angular speed measured by a gyro sensor 106.

When the actual speed of the vehicle is expressed by V, a virtual speed V' at a time when the rail track surface is viewed from an antenna 102 is expressed by the following equation (13) using the angle θ.

$$V'=V \times \sin(\theta-\eta) \quad (13)$$

Further, when the wavelength of the transmission signal is expressed by λ, the Doppler frequency Fd is expressed by the following equation (14).

$$Fd = 2 \times V'/\lambda \quad (14)$$

Therefore, using the equations (13) and (14), the traveling speed V of the vehicle is expressed by the following equation (15).

$$V = F \times \lambda / (2 \times \sin(\theta-\eta)) \quad (15)$$

where F is the output of the Doppler detector 112.

As a concrete operation, because the Doppler signal whose frequency is Fd is included in the output of the multiplier 111, the Doppler detector 112 extracts this Doppler signal. More specifically, the Doppler detector 112 removes a high frequency component from the signal from the multiplier 111 first by making the signal pass through a low pass filter, and extracts the Doppler signal. The Doppler detector then calculates a Doppler spectrum by Fourier-transforming the Doppler signal, and extracts the frequency F maximizing the Doppler spectrum. The frequency F maximizing this Doppler spectrum nearly matches the Doppler frequency Fd.

Then, the speed integrator 113 calculates the traveling speed V of the vehicle by using the equation (15). When the length of each of time intervals at which the speed integrator calculates the traveling speed V is expressed by ΔT, the distance ΔL which the vehicle has traveled during each time interval can be calculated as V×ΔT. Therefore, the speed integrator can calculated the travel distance of the vehicle by integrating this distance ΔL. When the reset signal is inputted from outside the travel distance measurement device via the input terminal 26, the speed integrator 113 returns the travel distance to zero. Other operations are the same as those shown in Embodiment 1, and the explanation of the operations will be omitted hereafter.

As mentioned above, because the travel distance measurement device in accordance with this Embodiment 3 is constructed in such a way as to additionally include the function of correcting a measuring error occurring when the vehicle is traveling around a curve as an extension of a device that determines the travel distance of a vehicle by using an existing Doppler method, the measurement accuracy of the travel distance can be improved greatly as compared with related art devices. Further, because the travel distance measurement device is constructed in such a way as to use a reflected wave from a direction in which the reflection intensity is maximized when calculating the travel distance of the vehicle by using an existing Doppler method, the measurement accuracy can be improved.

Although the case in which the gyro sensor 106 shown in Embodiment 1 is used as the curve parameter measuring unit is shown in Embodiment 3, this embodiment is not limited to this example. As an alternative, the angle measuring device 110 shown in Embodiment 2 can be used.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The travel distance measurement device in accordance with the present invention can measure the travel distance of a vehicle correctly even when the vehicle is traveling around a curve, and is suitable for use as a travel distance measurement device or the like that measures the travel distance of a vehicle such as a railroad train.

EXPLANATIONS OF REFERENCE NUMERALS 1 travel distance measurement device, 2 rail, 3 sleeper, 4 gravel, 5 vehicle body, 6, 6a, and 6b connection shaft, 7 railway bogie, 8 wheel, 9 outfitting member, 101 oscillator, 102 antenna, 102a transmitting antenna (transmitter), 102b receiving antenna (receiver), 103 amplifier, 104 IQ demodulator, 105 phase conversion integrator, 106 gyro sensor (curve parameter measuring unit), 107 correcting operation unit (correcting operator), 108 input terminal, 109 output terminal, 110 angle measuring device (curve parameter measuring unit), 111 multiplier, 112 Doppler detector, 113 speed integrator.

The invention claimed is:

1. A travel distance measurement device comprising:
a transmitter that is disposed in a vehicle and emits a transmission signal, as a radio wave, toward a ground surface;
a receiver that is disposed in a vicinity of said transmitter, and receives a radio wave emitted from said transmitter and reflected from said ground surface and acquires a reflection signal;
a distance calculator that calculates a travel distance of said vehicle on a basis of the reflection signal acquired by said receiver;

a curve parameter measuring unit that measures a predetermined parameter regarding curve traveling of said vehicle; and circuitry configured to correct the travel distance calculated by said distance calculator on a basis of the parameter measured by said curve parameter measuring unit, wherein said vehicle is a railroad vehicle including railway bogies;

wherein said circuitry configured to correct corrects the travel distance calculated by said distance calculator on a basis of the parameter measured by said curve parameter measuring unit, a distance between the railway bogies, and a distance between said travel distance measurement device and each of the railway bogies.

2. The travel distance measurement device according to claim 1, wherein the travel distance measurement device is outfitted to an underfloor area between the railway bogies.

3. The travel distance measurement device according to claim 1, wherein said curve parameter measuring unit is a gyro sensor that measures a rotation angular speed of said vehicle.

4. The travel distance measurement device according to claim 1, wherein said distance calculator calculates a phase by carrying out orthogonal detection on said reflection signal using said transmission signal, and integrates said phase over an interval of $2\pi$ or more to calculate the travel distance.

5. The travel distance measurement device according to claim 1, wherein said distance calculator includes:

a multiplier that multiplies said reflection signal by said transmission signal;

a Doppler detector that detects a Doppler signal from the signal which is multiplied by said transmission signal by said multiplier; and a speed integrator that calculates a speed of said vehicle from the Doppler signal detected by said Doppler detector, and that calculates the travel distance by integrating said speed.

6. A travel distance measurement device comprising:

a transmitter that is disposed in a vehicle and emits a transmission signal, as a radio wave, toward a ground surface;

a receiver that is disposed in a vicinity of said transmitter, and receives a radio wave emitted from said transmitter and reflected from said ground surface and acquires a reflection signal;

a distance calculator that calculates a travel distance of said vehicle on a basis of the reflection signal acquired by said receiver;

a curve parameter measuring unit that measures a predetermined parameter regarding curve traveling of said vehicle; and circuitry configured to correct the travel distance calculated by said distance calculator on a basis of the parameter measured by said curve parameter measuring unit, wherein said distance calculator calculates a phase by carrying out orthogonal detection on said reflection signal using said transmission signal, and integrates said phase over an interval of $2\pi$ or more to calculate the travel distance.

7. A travel distance measurement method performed by a travel distance measurement device, comprising:

emitting, from a vehicle which is a railroad vehicle including railway bogies, a transmission signal as a radio wave toward a ground surface;

receiving a radio wave which has been emitted and reflected from said ground surface and acquiring a reflection signal;

calculating a travel distance of said vehicle on a basis of the reflection signal which was acquired;

measuring a predetermined parameter regarding curve traveling of said vehicle; and correcting the travel distance which has been calculated on a basis of the parameter which has been measured, wherein the correcting corrects the travel distance calculated on a basis of the parameter which has been measured, a distance between the railway bogies, and a distance between said travel distance measurement device and each of the railway bogies.

8. A travel distance measurement method, comprising:

emitting, from a vehicle, a transmission signal as a radio wave toward a ground surface;

receiving a radio wave which has been emitted and reflected from said ground surface and acquiring a reflection signal;

calculating a travel distance of said vehicle on a basis of the reflection signal which was acquired;

measuring a predetermined parameter regarding curve traveling of said vehicle; and correcting the travel distance which has been calculated on a basis of the parameter which has been measured, wherein said calculating of the travel distance calculates a phase by carrying out orthogonal detection on said reflection signal using said transmission signal, and integrates said phase over an interval of $2\pi$ or more to calculate the travel distance.

* * * * *